US006145856A

United States Patent [19]

Conti

[11] Patent Number: 6,145,856

[45] Date of Patent: Nov. 14, 2000

[54] WHEELED CONTAINER

[75] Inventor: Rino Conti, Stoughton, Mass.

[73] Assignee: Holiday Housewares, Inc., Leominster, Mass.

[21] Appl. No.: 09/137,732

[22] Filed: Aug. 21, 1998

[51] Int. Cl.[7] .............. B62B 1/10

[52] U.S. Cl. .............. 280/47.26; 280/79.2; 220/908

[58] Field of Search .............. 280/47.26, 79.2, 280/79.3; 220/908; 301/1, 111, 125, 131, 132

[56] References Cited

U.S. PATENT DOCUMENTS

| | | | |
|---|---|---|---|
| D. 218,359 | 8/1970 | Marsh | D49/35 |
| D. 231,184 | 4/1974 | Brown et al. | D17/189 |
| 1,014,475 | 1/1912 | Holloway . | |
| 3,306,623 | 2/1967 | Weitzner | 280/11.19 |
| 3,346,271 | 10/1967 | Parsons | 280/33.99 |
| 3,366,397 | 1/1968 | Zeistra et al. | 280/47.26 |
| 4,351,539 | 9/1982 | Rodolakis | 280/47.26 |
| 4,550,813 | 11/1985 | Browning | 280/47.26 |
| 4,674,759 | 6/1987 | Parker | 280/47.26 |
| 4,848,782 | 7/1989 | Schmidt | 280/47.26 X |
| 5,031,796 | 7/1991 | Schafer et al. | 220/908 X |
| 5,088,750 | 2/1992 | Beese et al. | 280/47.26 |
| 5,205,433 | 4/1993 | Bitsch | 220/908 X |
| 5,217,135 | 6/1993 | Smith et al. | 220/908 X |
| 5,235,795 | 8/1993 | DeBusk | 220/908 X |
| 5,244,218 | 9/1993 | Irwin, Sr. | 280/47.26 X |
| 5,683,097 | 11/1997 | Fenton et al. | 280/47.26 X |
| 5,692,761 | 12/1997 | Havlovitz | 280/47.26 X |
| 5,722,788 | 3/1998 | Bent et al. | 404/6 |
| 5,743,542 | 4/1998 | Mast et al. | 280/47.26 |

*Primary Examiner*—Lanna Mai
*Assistant Examiner*—Ruth Ilan
*Attorney, Agent, or Firm*—Pandiscio & Pandiscio

[57] ABSTRACT

A wheeled container made of plastic has a bottom end wall formed with two wheel-receiving pockets and first and second C-configured spring clips disposed on opposite sides of each pocket and projecting away from the bottom end wall. Each clip has an open portion that faces outwardly from the container. A wheel assembly is associated with each pocket. Each wheel assembly consists of a wheel and first and second axle portions that are received by the first and second spring clips respectively of a pocket, with the wheel being received by and extending out of that pocket.

1 Claim, 6 Drawing Sheets

WHEELED CONTAINER

BACKGROUND OF THE INVENTION

1. Field of the Invention

This invention relates to plastic containers for rubbish, and the like, and is directed more particularly to a wheeled container having improved wheel mounting means.

2. Description of the Prior Art

Wheeled containers for rubbish, refuse, and the like, are generally well-known. See, for example, U.S. Pat. No. 1,014,475, issued January 1912, to Chester L. Holloway; U.S. Pat. No. 3,366,397, issued Jan. 30, 1968, to Charles F. Zeilstra et al; U.S. Pat. No. 4,351,539, issued Sep. 28, 1982, to Michael S. Rodolakis; U.S. Design Pat. No. 218,359, issued Aug. 11, 1970, to William J. Marsh; and U.S. Design Pat. No. 231,184, issued Apr. 9, 1974, to Thomas E. Brown et al.

Such containers typically are molded of plastics material. Wheel assemblies for such containers often include two wheels mounted on a single rigid axle, usually of metal. The container may be molded with axle holes therein or axle holes may be cut in the container after molding. The axle usually is inserted through the two holes. One wheel may be fixed to the axle before attachment of the axle to the container but the remaining wheel must be fixed to the axle after the axle is in place. Alternatively, there may be molded in a bottom surface of the container a groove for receiving the axle. In such case, an axle with both wheels fixed thereto may be placed in the groove. The groove is then closed, at least in part, by a bracket, or the like, fixed to the container by fasteners.

There is a need for such a container having a wheel assembly which may be pre-assembled and mounted, as is, on the container quickly and easily without the need to bore holes in the container, attach wheels to axles (other than during pre-assembly of the wheel assemblies), or attach axle-retaining brackets to the container.

SUMMARY OF THE INVENTION

It is, therefore, an object of the invention to provide a container having thereon one or more wheel assemblies which may be preassembled and quickly and easily snap-fitted onto the container.

With the above and other objects in view, as will hereinafter appear, a feature of the present invention is the provision of a wheeled container comprising a body defining a chamber for receiving and retaining selected materials, and defining an end wall for supporting the materials, the end wall defining a pocket open at an outside surface of the end wall and extending into the chamber. First and second C-configured spring clips are fixed to the end wall, each of the clips comprising first and second members that extend outwardly from the outside surface of the end wall and define an open portion of the C-configured clip, the open portion of each of the clips facing outwardly from the end wall away from the chamber. The first clip is disposed on a first side of the pocket and open to the pocket and the second clip is disposed on a second side of the pocket, is open to the pocket, and is aligned with the first clip. The clips receive and retain axially spaced portions of an axle of an axle/wheel assembly. A second pocket and a second pair of clips may be provided to accommodate a second axle/wheel assembly.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 6:
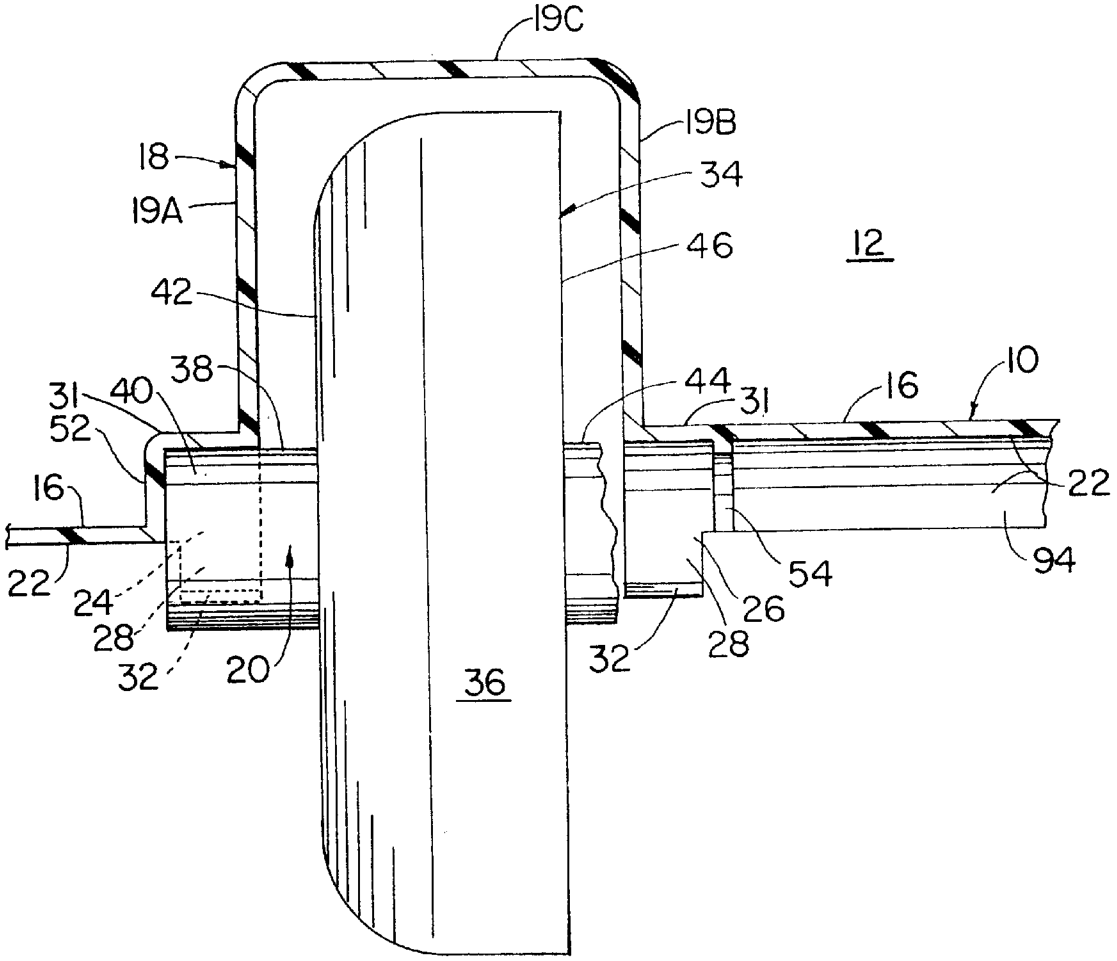
FIG. 6 is a sectional view of the container taken along line VI—VI of FIG. 5, with the wheel assembly shown in front elevation, a portion thereof being broken away.

Referring to FIGS. 1–4, it will be seen that an illustrative open top container includes a hollow body 10, preferably of a molded plastics material. The side wall 11 of and the bottom wall 16 of body 10 define a chamber 12 for receiving through its open top 14 selected materials (not shown), such as rubbish, refuse, and the like. The bottom end wall 16 is shaped so as to define a pocket 18 having an opening 20 on an outside (bottom) surface 22 of that wall 16, the pocket extending upwardly into the chamber 12. Pocket 18 comprises side walls 19A, 19B and a top wall 19C (FIG. 6).

Figure 1:
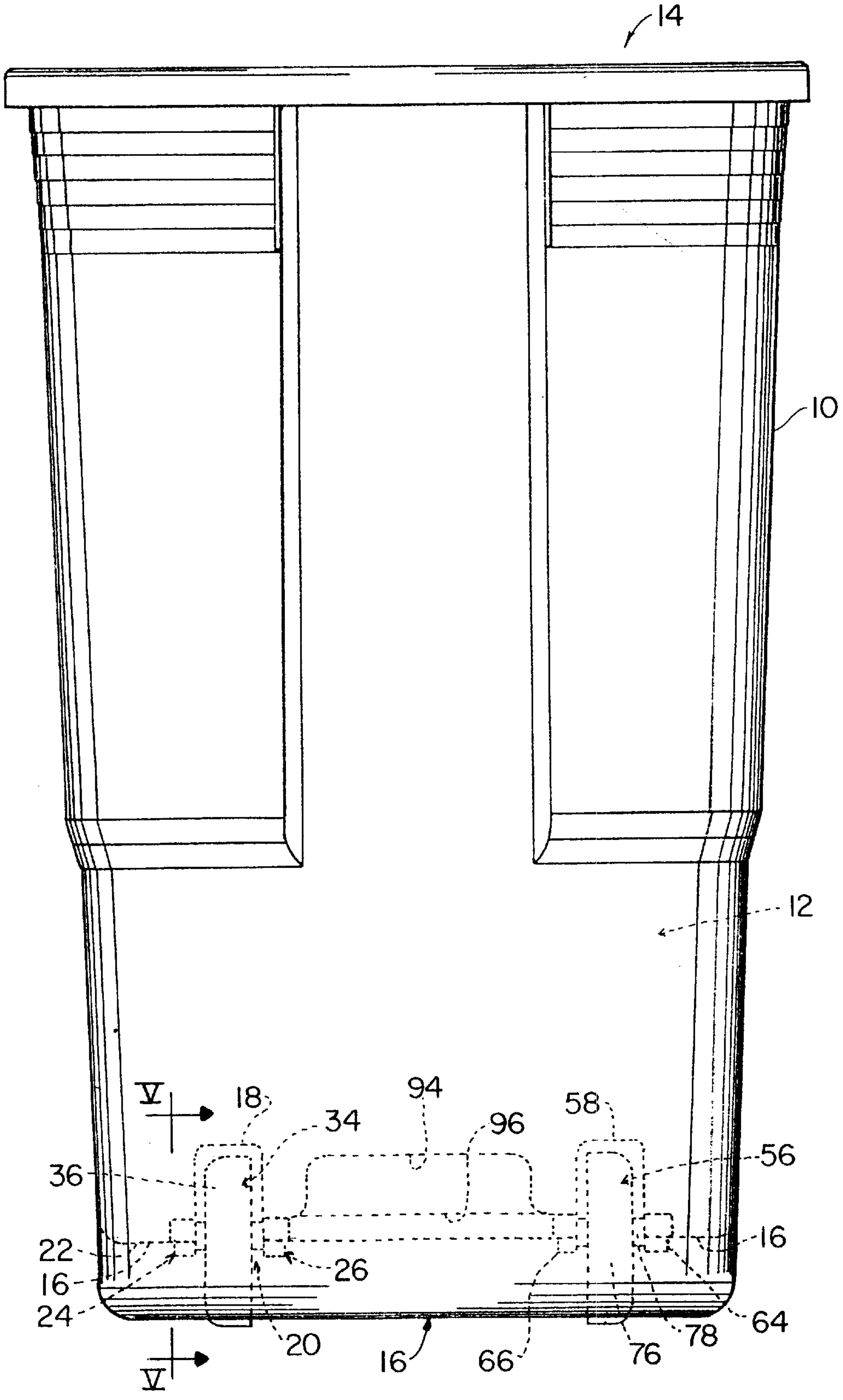
FIG. 1 is a front elevational view of one form of container illustrative of an embodiment of the invention.
Figure 2:
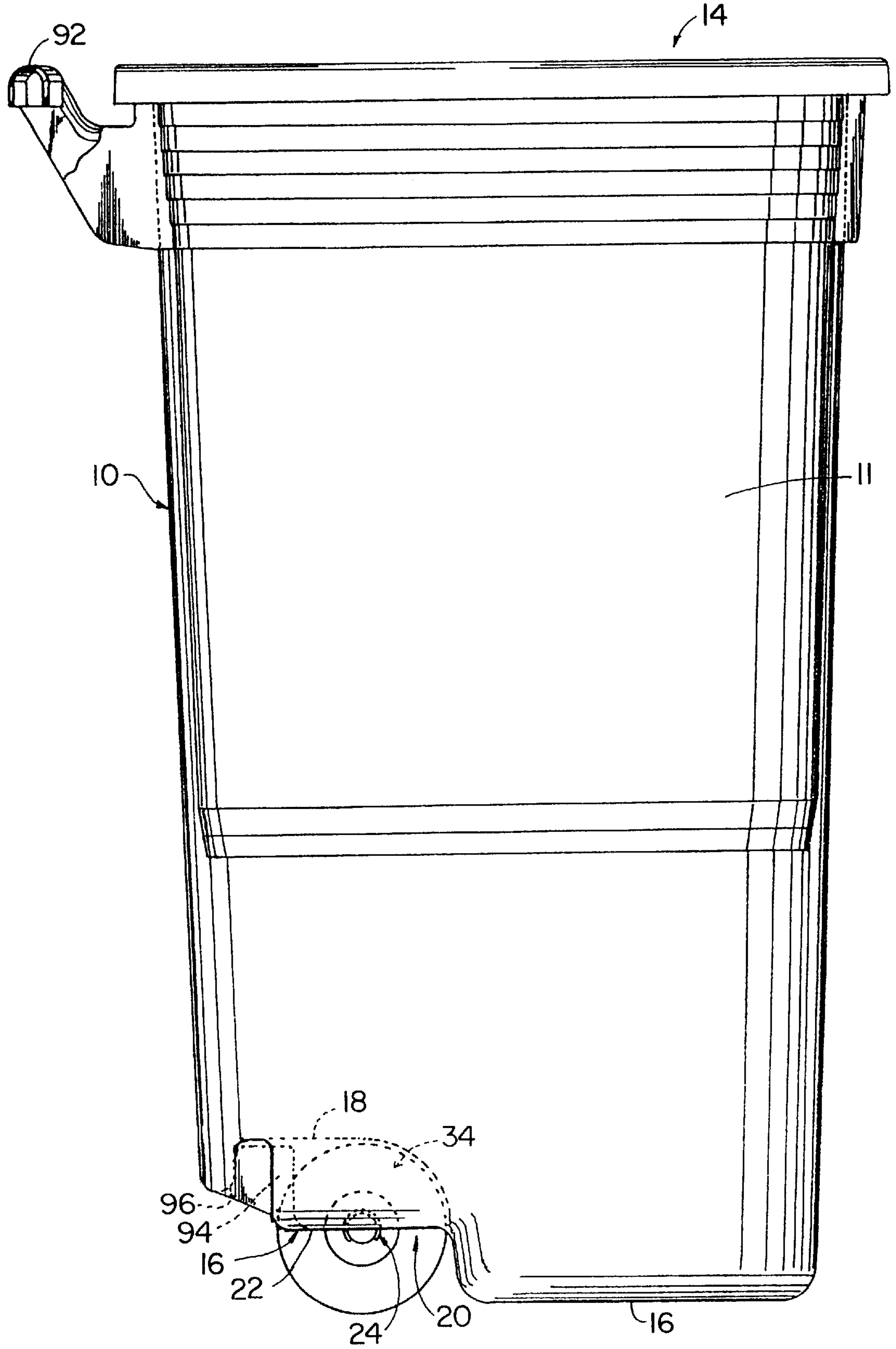
FIG. 2 is a side elevational view thereof.
Figure 3:
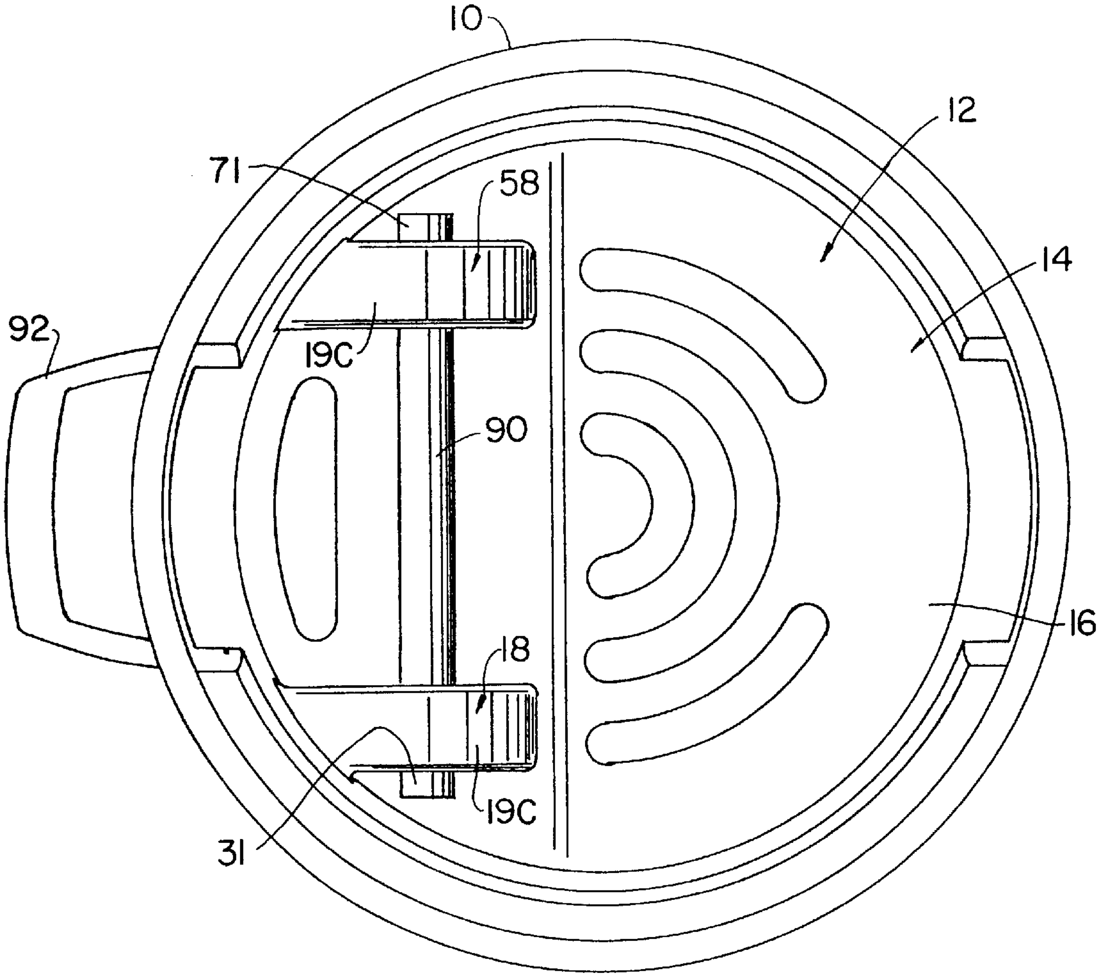
FIG. 3 is a top plan view thereof.
Figure 4:
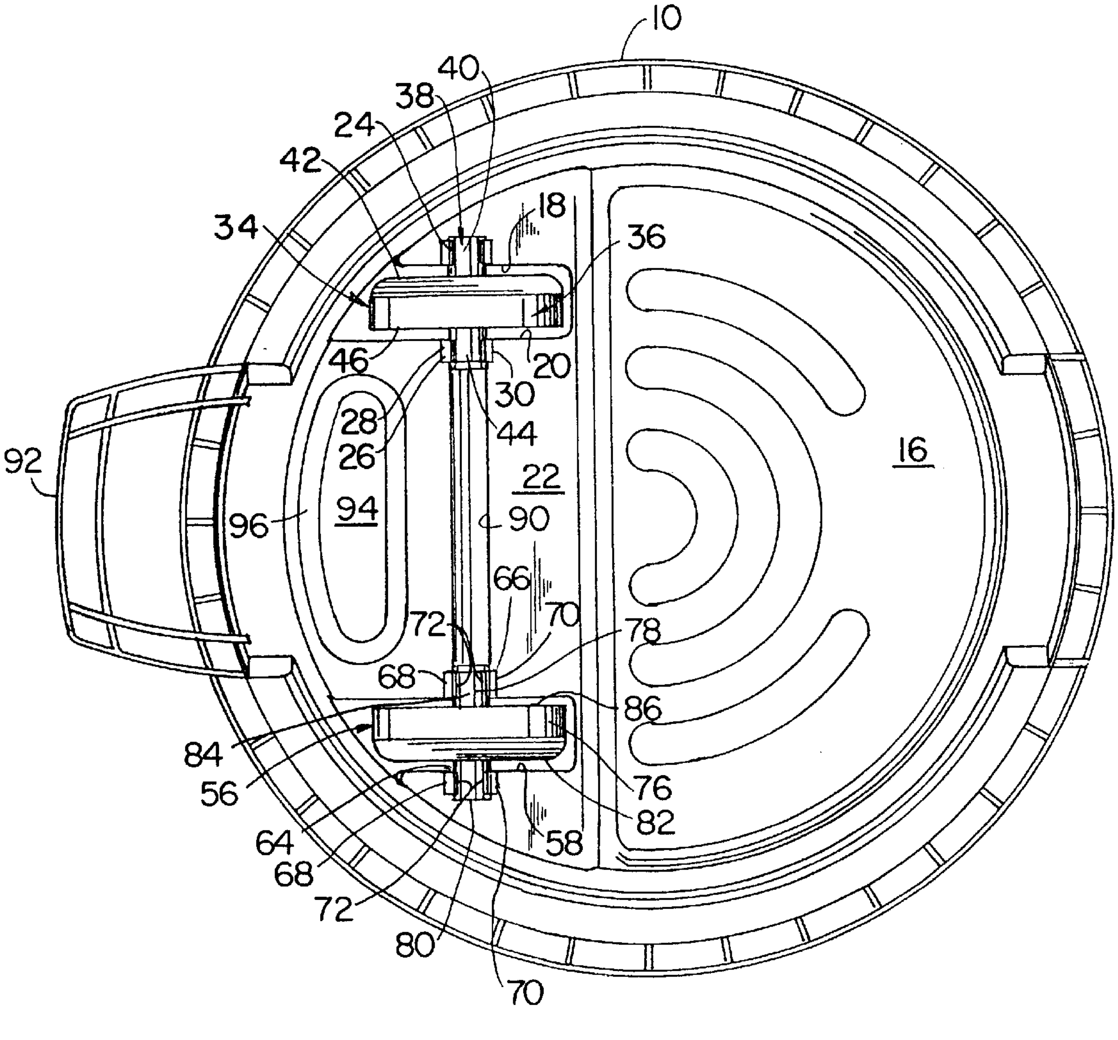
FIG. 4 is a bottom plan view thereof.
Figure 5:
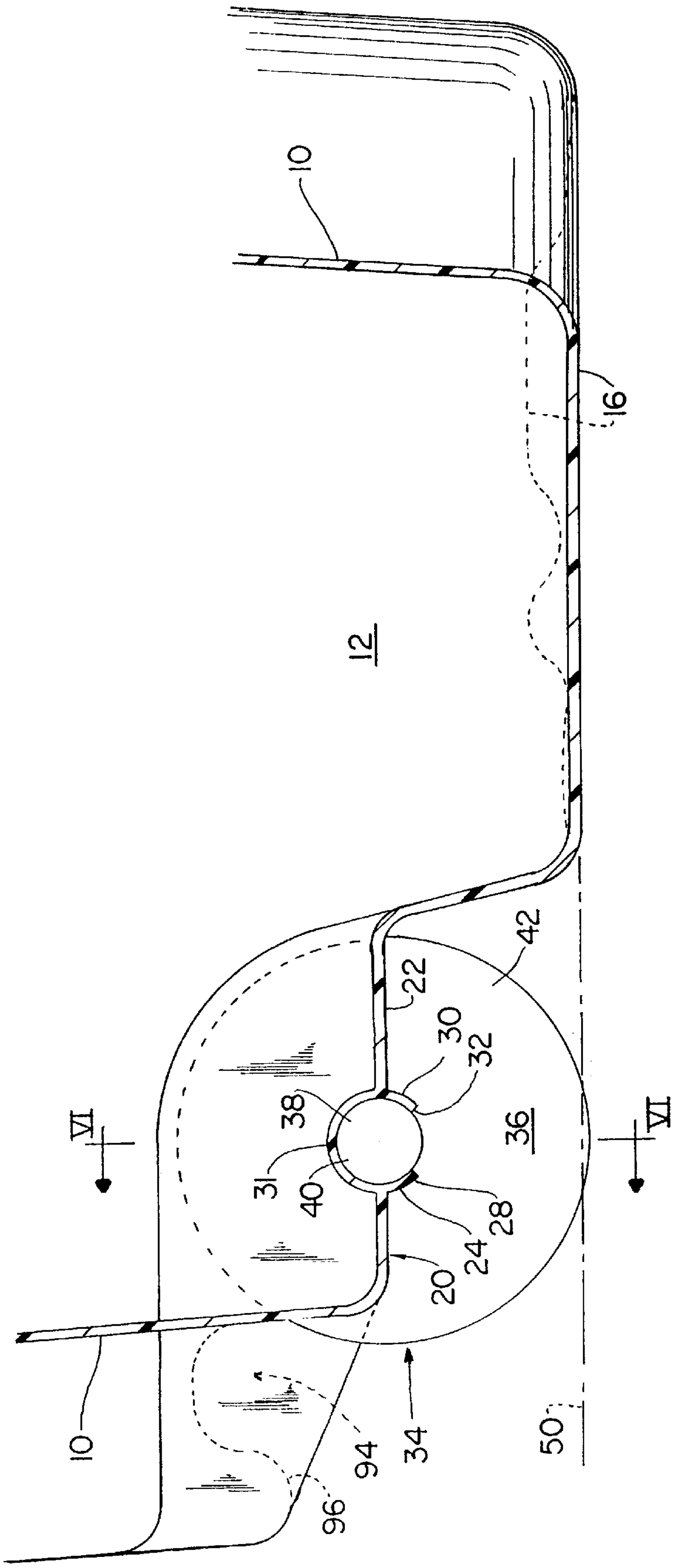
FIG. 5 is a sectional view taken along line V—V of FIG. 1.

First and second C-configured clips 24, 26 are molded integrally with the body 10. Each of the clips 24, 26 includes first and second members 28, 30 that extend outwardly from the outside surface 22 of the end wall 16 and a circularly curved center section 31 that is a part of end wall 16 (FIGS. 4–6). The clip members 28, 30 define a gap or open portion 32 for each of the clips 24, 26. The open portions 32 of the clips 24, 26 face outwardly (downwardly as shown in FIGS. 5 and 6) from the bottom end wall 16, away from the chamber 12. As shown in FIGS. 1, 4 and 6, the first clip 24 is disposed on a first side of the pocket 18 and is open to that pocket (FIG. 6). Similarly, the second clip 26 is disposed on a second side of the pocket 18 and is open to that pocket.

Referring to FIGS. 1–6, it will be seen that a wheel assembly 34 includes a wheel 36 and an axle 38 having first and second mutually aligned cylindrical portions 40 and 44 extending from first and second sides 42, 46 separately of the wheel. The first axle portion 40 is received by the first spring clip 24 in snap-in fashion, and the axle second portion 44 similarly is received by the second spring clip 26 in snap-in fashion, so as to securely but releasably mount the wheel assembly 34 on the end wall 16. The wheel 36 extends into the pocket 18 with a portion of the wheel extending out of the pocket. Preferably, but not necessarily, wheel 36 projects beyond a lower-most plane 50 (FIG. 5) of bottom end wall 16.

While the spring clip 24 is open towards the pocket 18 (FIG. 6), it is in part closed on its opposite side by a stop member 52 which is integral with the end wall 16 and clip members 28, 30 and 31 and partially closes off one side of the clip 24 to prevent axial movement of the axle 38 therebeyond. Though spring clip 26 is open towards the pocket 18, it is closed in part on its opposite side by a stop member in the form of a rib 54 formed integral with and extending radially from curved member 31 of clip 26. The rib 54 coacts with the adjacent end of axle 38 so as to limit axial movement of the axle away from stop member 52. Thus, the axle 38 is snugly retained by the clips 24, 26 between the stop members 52, 54.

As shown in FIGS. 1 and 4, in a preferred embodiment of the invention, the container is provided with two wheel assemblies 34, 56. In such instances, the end wall 16 defines a second like pocket 58 open on the outside surface 22 of the end wall 16 and extending into the chamber 12.

Third and fourth C-configured clips 64, 66 are molded integrally with body 10 at opposite sides of second pocket 58. Each of the clips 64, 66 includes first and second members 68, 70 (FIG. 4) that extend outwardly from the outside surface 22 of the end wall 16, and a circularly curved center section 71 (FIG. 3) that is a part of end wall 16. The clip members 68, 70 define a gap or open portion 72 for each of the clips 64, 66. The open portions 72 of the clips 64, 66 face outwardly from the bottom end wall 16, similarly to clips 24, 26, away from the chamber 12. As shown in FIGS. 1 and 4, the third clip 64 is disposed on a first side of the pocket 58 and is open to that pocket. Similarly, the fourth clip 66 is disposed on a second side of the pocket 58 and is open to that pocket.

Referring to FIG. 4, it will be seen that the wheel assembly 56 includes a wheel 76 and an axle 78 having a first cylindrical portion 80 extending from a first side 82 of the wheel 76, and a second cylindrical portion 84 extending from a second side 86 of the wheel 76. The first axle portion 80 is received by the third spring clip 64 in snap-in fashion, and the second axle portion 84 similarly is received by the fourth spring clip 66 in snap-in fashion, so as to securely but releasably mount the wheel assembly 56 on the end wall 16. The wheel 76 extends into the pocket 58 with a portion of the wheel extending out of the pocket and beyond a lowermost plane 50 of the end wall 16, similar to first wheel portion 48 (FIG. 5).

While the spring clip 64 is open towards the pocket 58, it is in part closed on its opposite side by a stop member (not shown) similar to stop member 52, and which is integral with the end wall 16 and which closes off one side of the clip 64 to prevent axial movement of the axle 78 therebeyond. Though spring clip 66 is open towards the pocket 58, it is closed in part on its opposite side by a stop member in the form of a rib (not shown) similar to rib 54 (FIG. 6) extending from end wall outside surface 22. Those stop members coact with the adjacent ends of axle 78 so as to limit its axial movement while it is gripped by clips 64, 66.

The body 10 is molded of a plastic material, including the clip members 28, 30 and 68, 70. Preferably, the wheel assemblies also are made of plastic. It is a preferred and novel feature of the invention to mold the axles and wheels as a one-piece unit. More specifically, in applicant's preferred embodiment, the axle portions 40, 44 and 80, 84 are formed as integral coaxial extension of the center or hub portions of wheels 36, 76. Preferably such wheel assemblies are made of high density polyethylene. These unitary assemblies 34, 56 are easily snapped into the clips without use of any tools and without requiring any further wheel mounting procedure. The diameters of axle portions 40, 44 and 80, 84 are sized so that they can rotate on their axes while captured by clips 24, 26 and 64, 66 respectively.

It is also contemplated that for some applications it may be preferred to have the two wheels connected to one another by a common axle member. Accordingly in contemplation of such modifications, the bottom end wall 16 may be formed so that its outer surface defines a channel 90 for receiving the portion of the common axle member (not shown) that extends between the two wheels. Channel 90 is formed with a circularly-curved cross-sectional configuration. Channel 90 extends between clips 26 and 66 and forms an extension of the circularly curved center sections 31, 71 of those clips. If channel 90 is to be used to accommodate part of a common axle, the mold for making the plastic container is modified so as to prevent formation of rib 54 and its counterpart for clip 64. Alternatively the rib 54 may be formed as shown but the common shaft contoured so as to override these ribs, whereupon the ribs serve as bearings for the further axle portion.

The container 10 also is formed with a top handle 92 (FIGS. 2–4) and a bottom hand-grip provided by forming a recess 94 in the bottom wall 16. Recess 94 is centered between the two wheel pockets 18 and 58 and is located near the perimeter of the bottom wall, so as to leave a narrow hand-gripping section 96 aligned with handle 92. In use, the container is grasped by handle 92 and tilted so that the only contact between the container and a surface on which the container rests is through the wheel or wheels mounted thereon. The container is then rolled to an appropriate dump site as, for example, a refuse collection truck. The axles 38, 78 turn in their respective clips 24, 26 and 64, 66. By grasping the handle 92 with one hand and hand-hold 96 with the other hand, the container may easily be inverted to dump the contents out of the chamber 12.

There is thus provided a wheeled container having thereon one or more wheel assemblies, which wheel assemblies may be pre-assembled and quickly and easily snap-fitted onto the container.

It is to be understood that the present invention is by no means limited to the particular construction herein disclosed and/or shown in the drawings, but also comprises modifications or equivalents within the scope of the claims. For example, while the container is shown as having a generally cylindrical or barrel shape, it is to be understood that it may have some other cross-sectional configurations, e.g., its side wall 11 may define a chamber 12 of rectangular cross-section. Also, while a two-wheeled container is shown for illustrative purposes, it will be apparent that similar devices such as wheel-barrows, carts, mobile collection boxes, and the like, typically may be fitted with 14 wheels as described herein.

What is claimed is:

1. A wheeled container comprising:

a body made of a plastic material and defining an open-top chamber for receiving and retaining selected materials, said chamber being defined in part by an end wall of said body, said end wall being shaped so as to define first and second wheel-receiving pockets open at an outside surface of said end wall and extending into said chamber;

first and second C-configured spring clips formed integral with said end wall and made of the same material as said body, each of said clips comprising first and second members that extend outwardly from said outside surface of said end wall and define an open portion of said clip, said open portion of each of said clips facing outwardly from said end wall away from said chamber, said first clip being disposed on a first side of said first pocket and open to said first pocket and said second clip being disposed on a second side of said first pocket, open to said first pocket, and aligned with said first clip;

a first wheel assembly comprising a first wheel and a first axle, a first portion of said axle extending from a first side of said wheel, and a second portion of said axle extending from a second side of said wheel, said first axle portion being received by said first spring clip in snap-in fashion, and said second axle portion being received by said second spring clip in snap-in fashion, so as to mount said wheel assembly to said end wall with said wheel projecting into and rotatable in said first pocket;

third and fourth C-configured spring clips formed integral with said end wall and made of the same material as said body, each of said third and fourth clips comprising first and second members that extend outwardly from said outside surface of said end wall and define an open portion of said clip, said open portions of said third and fourth clips facing outwardly from said end wall away from said chamber, said third clip being disposed on a first side of said second pocket and open to said second pocket, and said fourth clip being disposed on a second side of said second pocket, open to said second pocket, and aligned with said third clip;

a second wheel assembly comprising a second wheel and a second axle, a first portion of said second axle extending from a first side of said second wheel, and a second portion of said second axle extending from a second side of said second wheel, said second axle first portion being received by said third spring clip in snap-in fashion, and said second axle second portion being received by said fourth spring clip in snap-in fashion so as to mount said second wheel assembly to said end wall, with said second wheel projecting into and rotatable in said second pocket;

four stop members formed integral with said end wall, first and second ones of said stop members being disposed adjacent said first and second clips so as to limit axial movement of said first axle relative to said first and second clips, and third and fourth ones of said stop members being disposed adjacent said third and fourth clips so as to limit axial movement of said second axle relative to said third and fourth clips; and said end wall being formed with a channel that extends between said pockets, with two of said stop members extending into said channel.

* * * * *